United States Patent [19]

Takeuchi et al.

[11] 4,307,413
[45] Dec. 22, 1981

[54] COMB FILTER DEVICE

[75] Inventors: Akihiro Takeuchi, Ikoma; Masa-aki Kobayashi, Kawanishi, both of Japan

[73] Assignee: Matsushita Electric Industrial Co., Ltd., Osaka, Japan

[21] Appl. No.: 112,442

[22] Filed: Jan. 16, 1980

[30] Foreign Application Priority Data

Jan. 18, 1979 [JP] Japan .................................. 54-4507
Mar. 12, 1979 [JP] Japan .................................. 54-29143

[51] Int. Cl.³ ......................................... H04N 9/535
[52] U.S. Cl. ....................................... 358/31; 328/167
[58] Field of Search ..................... 358/31, 36, 40, 8; 328/167, 166, 165

[56] References Cited

U.S. PATENT DOCUMENTS 4,050,084  9/1977  Rossi ..................................... 358/31
4,178,609 12/1979  Beutel .................................... 358/31

Primary Examiner—John C. Martin
Attorney, Agent, or Firm—Wenderoth, Lind & Ponack

[57] ABSTRACT

A comb filter device has two operation modes, one mode being a conventional comb filter when input signals have high correlation between sequential lines, and the other mode being a simple amplifier when input signals have low or no line correlation. Therefore, this comb filter has little deterioration of vertical resolution of a television picture.

5 Claims, 15 Drawing Figures

COMB FILTER DEVICE

This invention relates to improvements of a comb filter for video signal processing, and more particularly to an improved vertical resolution of television pictures.

A conventional comb filter is constructed by a delay line and an operational amplifier circuit, which is used to eliminate the cross-color of NTSC color video signal, to reduce chroma noise, and to eliminate the chroma cross-talk signal between video tracks in a consumer video tape recorders.

However, the conventional comb filter causes deterioration of vertical resolution of television pictures when correlation between sequential lines in a video signal is little.

Accordingly, it is an object of this invention to provide a comb filter device which causes no or almost no deterioration of vertical resolution. This object is achieved according to this invention by providing a comb filter device comprising two modes, one mode being that of a conventional comb filter when the levels of input signals thereto to be rejected thereby are lower than a predetermined thereshold level, and the other mode being that of an amplifier to pass input signals thereto to its output.

More specifically, the object of this invention is achieved by providing such a comb filter device comprising: first comb filter supplied with input signals; second comb filter supplied with said input signals, said second comb filter having complementary characteristics against said first comb filter; signal amplifier supplied with said input signal for producing an output signal having an amplitude the same as the maximum output amplitude of said first comb filter; a level detector coupled to said second comb filter for judging the level of output signal of said second comb filter; and switching means controlled by said level detector for switching the output signals of said first comb filter and said signal amplifier in such a way that said switching means passes said the output signals of said first comb filter when the level of output signal of said second comb filter is lower than a predetermined thereshold level, and said switching means passes said output signals of said signal amplifier when the level of output signal of said second comb filter is higher than said thereshold level.

According to this invention, because of the two modes of comb filter device, i.e. one mode being a comb filter when input signals have high line correlation, and the other mode being a simple amplifier when input signals have low or no line correlation, this comb filter device provides less deterioration of vertical resolution. This comb filter device reduces chroma noise, eliminates the chroma cross-talk signal during video tracks of a consumer video tape recorder and prevents unnaturalness of the line sequential signal systems without deterioration of vertical resolution of chroma signals.

The above object and features of this invention will be apparent upon considering the following detailed descriptions taken together with the companying drawings, wherein.

In the drawings, like elements will be designated by like reference numerals. Before a preferred embodiment of this invention being described in detail, a conventional comb filter will be described below with reference to FIG. 2.

Figure 2:
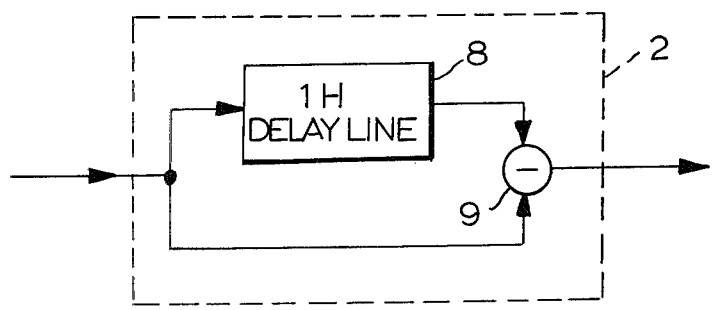
FIG. 2 is a block diagram of a conventional "C" type comb filter.
Figure 6:
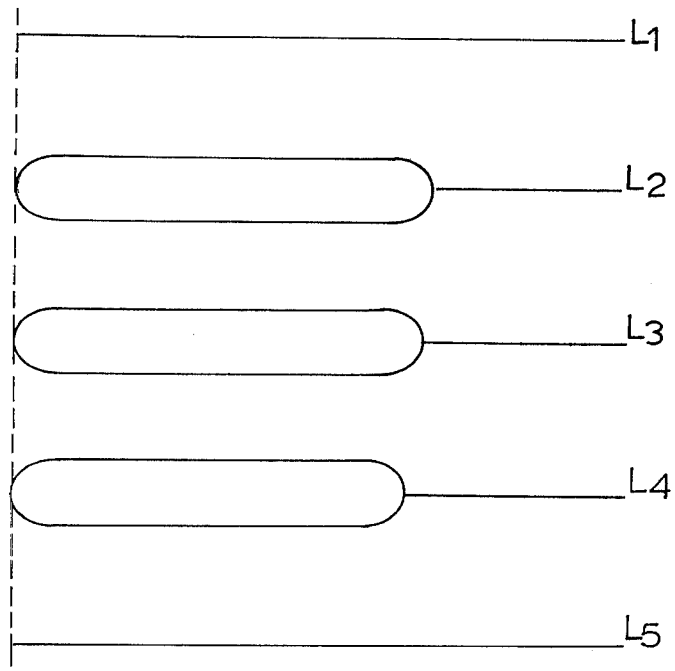
FIG. 6 to FIG. 10 show signals appearing at various points of the device of FIG. 1.

Referring to FIG. 2, a conventional "C" type comb filter is constructed by a 1H delay line 8 (delay time being 63.556 $\mu$sec.) and a subtracter 9. In the drawing, $f_H (=15.734\ KH_z)$ is the horizontal scanning frequency, and $$f_s \left( = \frac{455}{2} \times f_H \right)$$

is the chrominance sub-carrier frequency. Tone-burst signals which are shown in FIG. 6 are supplied to said "C" type comb filter 2. The tone-burst signals have band-width of ±500 KHz and frequency of $f_s$.

Figure 7:
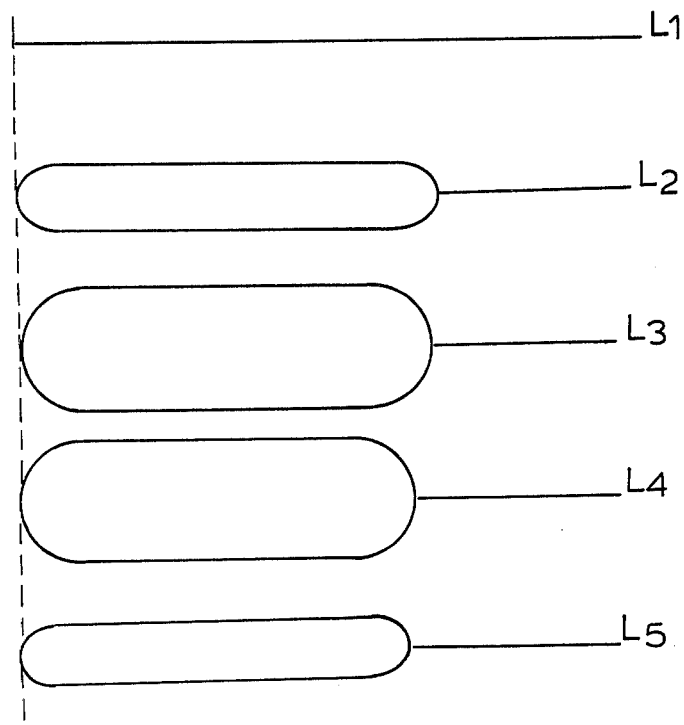

In FIG. 6, $L_1$ to $L_5$ are numbers to show horizontal lines and the horizontal lines of $L_2$ to $L_4$ include the tone-burst signals. The output signals of the filter 2 are shown in FIG. 7. In FIG. 7, the signal level of $L_3$ and $L_4$ whose signals have line correlation are double, and a tone-burst signal whose level is the same as the input signal level appears on $L_5$. As a result, the deterioration of vertical resolution occurs as shown in FIG. 7.

Figure 1:
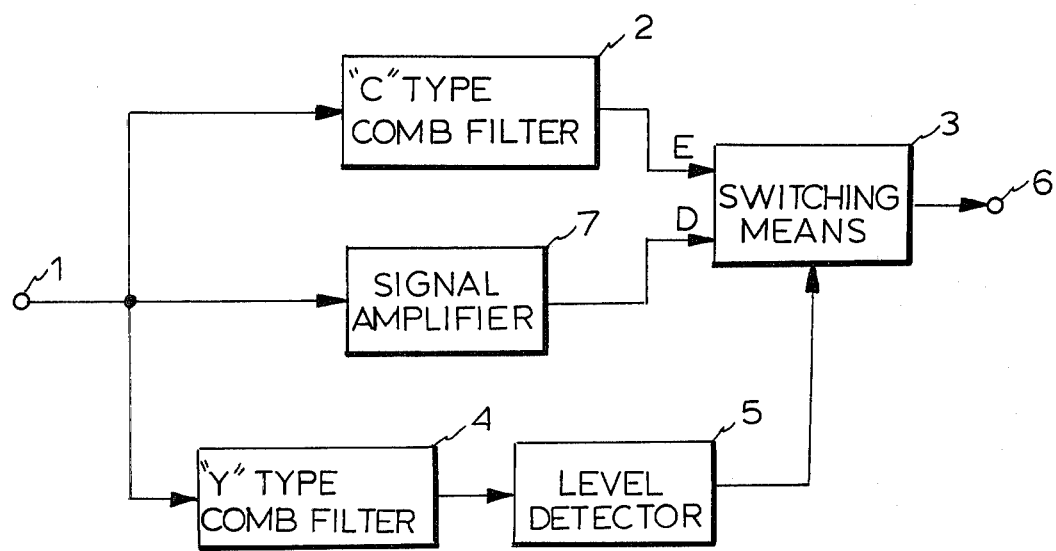
FIG. 1 is a block diagram of an example of a comb filter device according to this invention.
Figure 3:
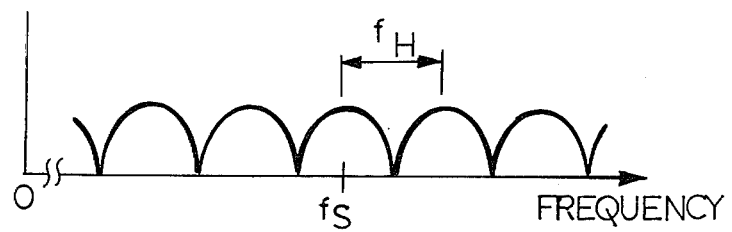
FIG. 3 shows frequency characteristics of the "C" type comb filter.
Figure 4:
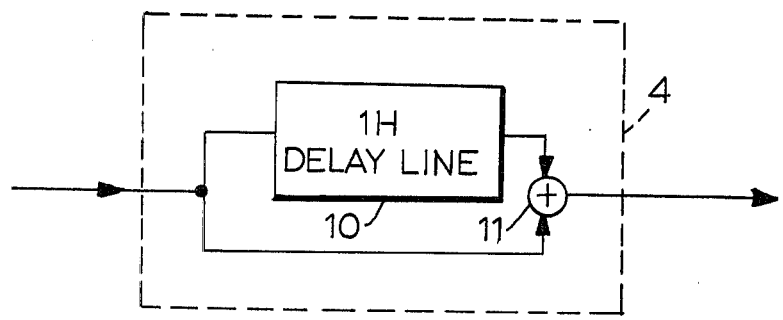
FIG. 4 is a block diagram of a conventional "Y" type comb filter.

Now, a preferred embodiment of this invention will be described. Referring to FIG. 1, the comb filter of this invention is constructed by an input terminal 1, a "C" type comb filter 2, a switch 3, a "Y" type comb filter 4, a level detector 5, a signal amplifier 7 and an output terminal 6. A construction of the filter 2 is shown in FIG. 2, and a construction of the filter 4 is shown in FIG. 4. A signal f(t) is supplied to the filter 2, and the output of the filter 2 provides the output signal $G_c(t)=f(t)-f(t-H)$. FIG. 3 shows the characteristics of the comb filter 2.

Figure 5:
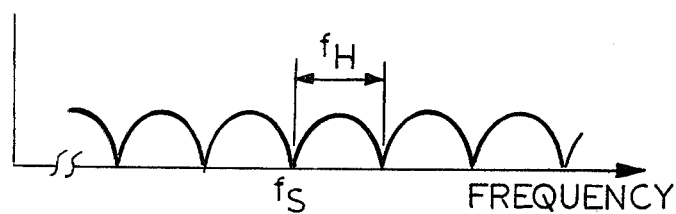
FIG. 5 shows frequency characteristics of the "Y" type comb filter.

The filter 4 is constructed by using a 1H delay line 10 and an adder 11, and its frequency characteristics are shown in FIG. 5. Input signal f(t) is supplied to the filter 4, and the output of the filter 4 provides the output signal $G_Y(t)=f(t)+f(t+H)$. The "C" type comb filter 2 and the "Y" type comb filter 4 are complementary to each other.

Tone-burst signals shown in FIG. 6 are supplied to the input terminal 1. The output signals of the filter 2, as shown in FIG. 7, are twice as large as input signals at $L_3$ and $L_4$ lines whose tone-burst signals have line correlation.

Figure 8:
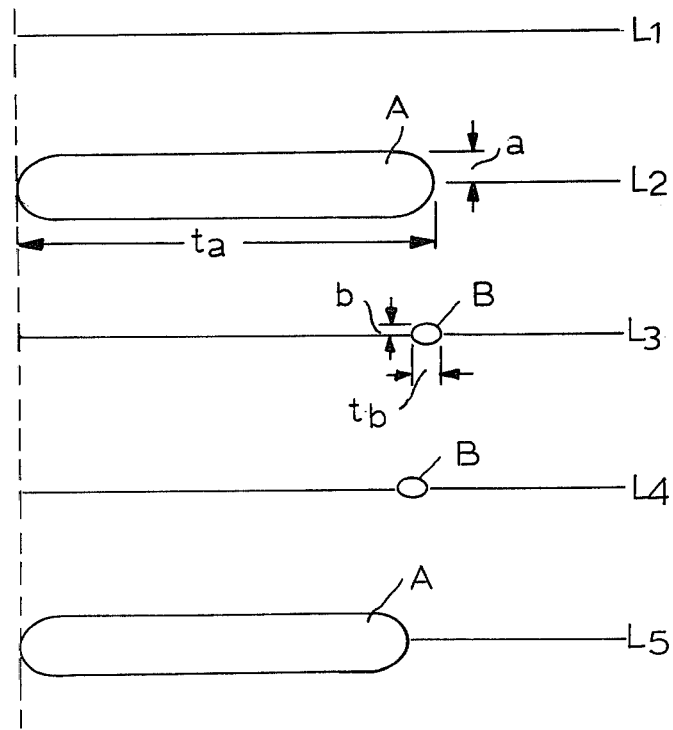

The output signals of the filter 4, as shown in FIG. 8, appear at parts A and B where the input signals have no line correlation. The difference between "a" level of part A and "b" level of part B is large enough to be detectable by the level detector 5. The detectable difference results from difference of the signal durations $t_a$ and $t_b$ of signals limited as to their band-width (for example their band-width is $f_S \pm 500$ KHz).

Figure 9:
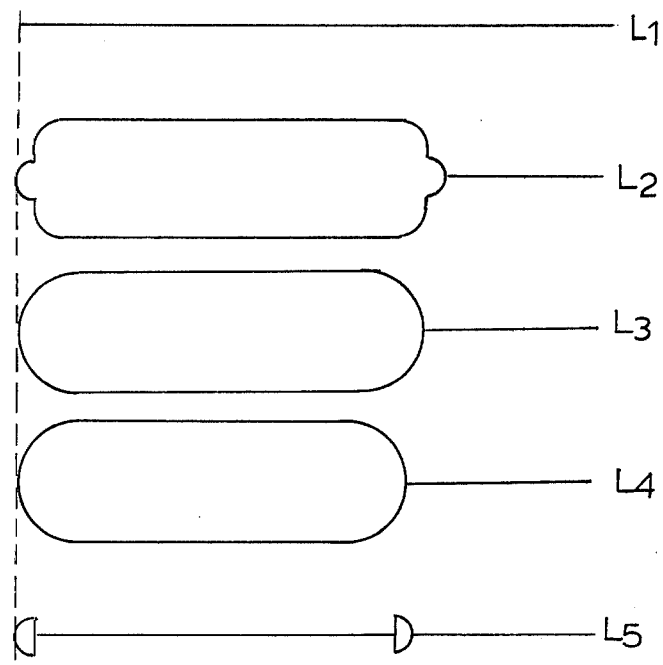
Figure 10:
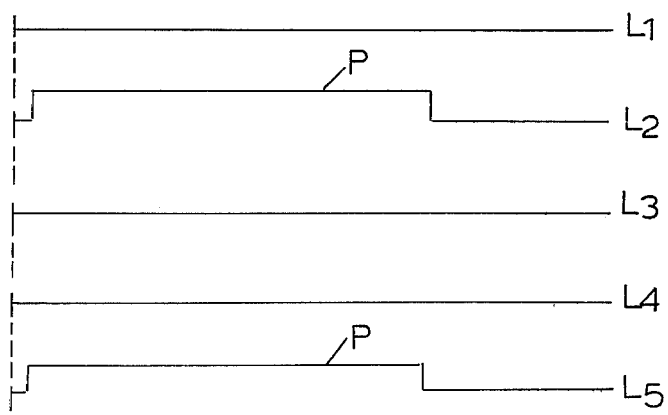

The output pulses P of the level detector 10 are shown in FIG. 10. The pulses P are generated when the output level of the filter 4 is over a threshold which is set up between the "a" level and the "b" level. The switching means 3 is actuated by the pulse P so as to connect the filter 2 to the output terminal 6, but normally the switching means connects the signal amplifier 7 to the output terminal 6. The apparent signals at the output terminal 6 are shown in FIG. 9 when the gain of the signal amplifier 7 is twice.

Since the "C" type comb filter is constructed with little deterioration of vertical resolution according to this invention, this comb filter of this invention can be used for the separation of chroma signals from NTSC color video signals, for the elemination of cross color with little deterioration, and for the prevention of unnaturalness in the line sequential signal systems without deterioration.

In other words, the circuit shown in FIG. 1 has two modes. One mode (mode I) is a conventional "C" type comb filter, and the other mode (mode II) is a simple amplifier whose amplitude is twice. And the mode exchange is decided by the output level of the "Y" type comb filter 4.

Figure 11:
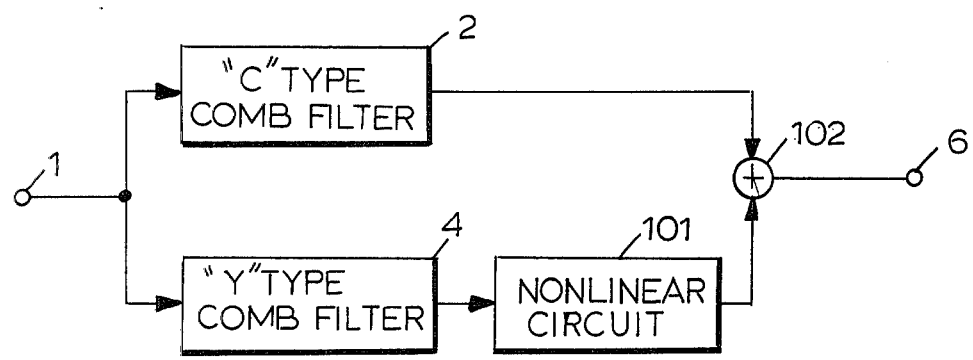
FIG. 11 is a block diagram of another example of a comb filter device according to this invention.
Figure 12:
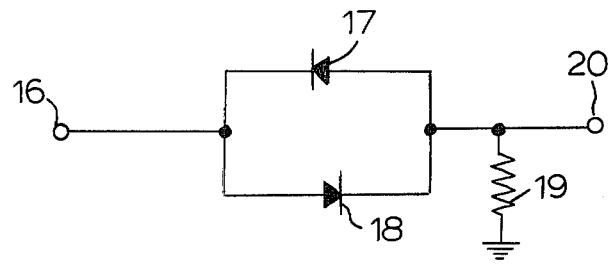
FIG. 12 is an exemplary circuit of the nonlinear circuit of FIG. 11.
Figure 13:
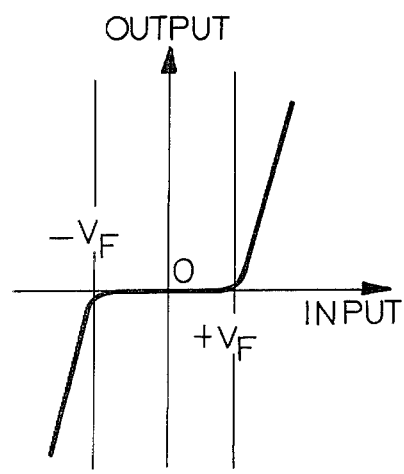
FIG. 13 shows characteristics of the nonlinear circuit of FIG. 12.
Figure 14:
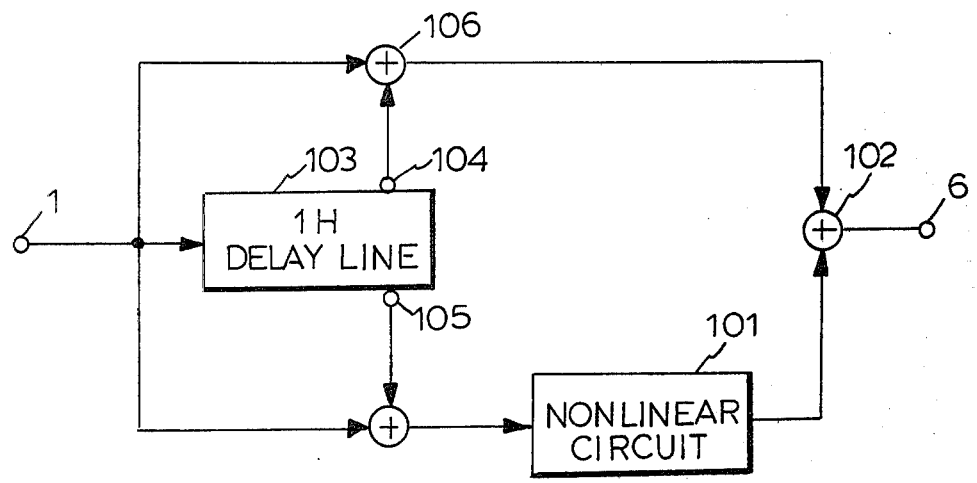
FIG. 14 and FIG. 15 are block diagrams of other examples of comb filter devices according to this invention.

Another preferred embodiment of this invention will be described. Referring to FIG. 11, another comb filter device of this invention is constructed by an input terminal 1, a "C" type comb filter 2, a "Y" type comb filter 4, a nonlinear circuit 101 whose detail is shown in FIG. 12, an adder 102, and an output terminal 6. In FIG. 11, the mode exchange is performed by the nonlinear circuit 101 and the adder 102. This nonlinear circuit 101 is constructed by an input terminal 16, a diode 17, a diode 18, a register 19 and an output terminal 19. The characteristics of the nonlinear circuit 101 are shown in FIG. 13. In FIG. 13, $V_F$ is a forward conducting voltage of the diode 17 or 18 and is equivalent to the threshold level of the level detector 10. When the output level of the filter 4 is over $V_F$, the output signals of the filter 4 are supplied to the adder 102. A signal f(t) is supplied to the input terminal 1, and the output signal of the "C" type comb filter 2 is $G_C(t)=f(t)-f(t-H)$ and the output signal of the "Y" type comb filter 4 is $G_Y(t)=f(t)+f(t-H)$. As the adder 102 produces a sum $G_C(t)+G_Y(t)$, signal 2f(t) is supplied to the output terminal 6. This condition is the above-mentioned mode II. When the output level of the filter 4 is lower than $V_F$, the output signals of the filter 4 are not supplied to the adder 102. Only the output signals of the filter 2 are supplied to the adder 102. In consequence, the circuit shown in FIG. 11 is a conventional "C" type comb filter and this condition is the above-mentioned mode I.

The nonlinear circuit 101 can be constructed by a pair of series-connected diodes or by a combination of a pair of diodes and a resistor to adjust the threshold level.

In the above description, the "C" type comb filter 2 and the "Y" type comb filter have basic construction using 1H delay line. But a comb filter using 2H delay line or a type of a comb filter using a negative feed back also can be used for this invention.

Figure 15:
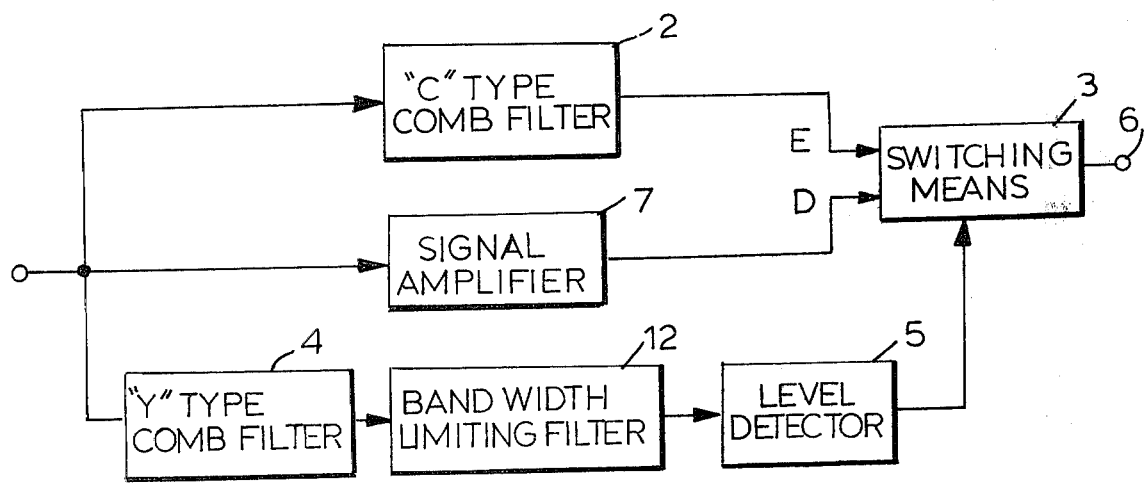

Further, this invention uses the translation of duration to level by utilizing input signal band-width of $f_S \pm 500$ KHz for distinguishment between part A which causes the deterioration of vertical resolution and part B which does not cause the deterioration. If input signals do not have band-width limitation, it is necessary to insert a band-width limiting filter 12 before the level detector 5 as shown in FIG. 15.

In this invention since the "C" type comb filter 2 and the "Y" type comb filter 4 are complementary to each other, they can be exchanged in FIG. 1, and such exchanged filter is a "Y" type comb filter having little deterioration of vertical resolution.

What is claimed is:

1. A comb filter device comprising two modes, one mode being that of a comb filter when the level of input signals thereto to be rejected thereby are lower than a predetermined threshold level, and the other mode being that of an amplifier which passes signals to the output when the level of input signals to be rejected is higher than said threshold level.

2. A comb filter device as claimed in claim 1 wherein said device comprises:
   first comb filter supplied with input signals;
   second comb filter supplied with said input signals, said second comb filter having complementary characteristics against said first comb filter;
   signal amplifier supplied with said input signal for producing an output signal having an amplitude the same as the maximum output amplitude of said first comb filter;
   a level detector coupled said second comb filter for judging the level of output signal of said second comb filter; and
   switching means controlled by said level detector for switching the output signals of said first comb filter and said signal amplifier in such a way that said switching means passes said output signals of said first comb filter when the level of output signal of said second comb filter is lower than a predetermined threshold level, and said switching means passes said output signals of said signal amplifier when the level of output signal of said second comb filter is higher than said threshold level.

3. A comb filter device as claimed in claim 2, which further comprises band-width limiting filter means between said second comb filter and said level detector.

4. A comb filter device as claimed in claim 1, wherein said device comprises:
   first comb filter means and second comb filter means which are supplied with same input signals and which have complementary characteristics;
   a nonlinear circuit which is coupled to said second comb filter means, and which passes input signals when said input signal level is higher than said threshold level, and which stops said input signals when said input signal level is lower than said threshold level; and
   an adder means coupled to said first comb filter and said nonlinear circuit for adding their output signals.

5. A comb filter device as claimed in claim 4, wherein said nonlinear circuit is constructed by a pair of diodes or some pairs of diodes connected in such a way that the electrodes at each connecting point of adjacent ones of said diodes are of types of polarities opposite to each other.

* * * * *